United States Patent
Tiotto et al.

(10) Patent No.: US 10,558,441 B2
(45) Date of Patent: Feb. 11, 2020

(54) COMPILER FOR RESTRUCTURING CODE USING ITERATION-POINT ALGEBRAIC DIFFERENCE ANALYSIS

(71) Applicant: INTERNATIONAL BUSINESS MACHINES CORPORATION, Armonk, NY (US)

(72) Inventors: Ettore Tiotto, Whitby (CA); Jose N. Amaral, Edmonton (CA); Artem Chikin, Edmonton (CA); Taylor Lloyd, Edmonton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 15/918,334

(22) Filed: Mar. 12, 2018

(65) Prior Publication Data
US 2019/0278575 A1    Sep. 12, 2019

(51) Int. Cl.
*G06F 8/41*    (2018.01)
(52) U.S. Cl.
CPC ................... *G06F 8/4441* (2013.01)
(58) Field of Classification Search
CPC .......................................... G06F 8/4441
USPC .................................... 717/136–167
See application file for complete search history.

(56) References Cited

U.S. PATENT DOCUMENTS

| | | | |
|---|---|---|---|
| 5,878,261 A * | 3/1999 | Holler | G06F 9/4484 717/157 |
| 6,247,173 B1 | 6/2001 | Subrahmanyam | |
| 7,228,529 B2 * | 6/2007 | Bera | G06F 8/72 717/137 |
| 7,506,331 B2 | 3/2009 | Archambault et al. | |
| 7,574,704 B2 * | 8/2009 | Fulton | G06F 8/443 717/128 |

(Continued)

OTHER PUBLICATIONS

Lee, Jaejin, Yunheung Paek, and Peng Tu. "Restructuring programs for high-speed computers with Polaris." 1996 Proceedings ICPP Workshop on Challenges for Parallel Processing. IEEE, 1996. (Year: 1996).*

(Continued)

*Primary Examiner* — Satish Rampuria
(74) *Attorney, Agent, or Firm* — Cantor Colburn LLP; Noah Sharkan

(57) ABSTRACT

Embodiments of the present invention facilitate pruning a dependence graph for a loop in a computer program. An example computer-implemented method includes determining, by a compiler, a source and a sink of a dependence in the dependence graph. The method further includes determining, by the compiler, a source symbolic expression for the source, and a sink symbolic expression for the sink. The method further includes constructing, by the compiler, a difference expression using the source symbolic expression and the sink symbolic expression. The method further includes checking, by the compiler, if the difference expression is indicative of a memory overlap between the source and the sink. The method further includes, in response to the difference expression being indicative of no overlap, removing the dependence from the dependence graph, and generating object code for the computer program based on the dependence graph.

11 Claims, 9 Drawing Sheets

(56) References Cited

U.S. PATENT DOCUMENTS

| | | | |
|---|---|---|---|
| 7,934,205 B2* | 4/2011 | Bera | G06F 8/72 703/26 |
| 8,032,876 B2* | 10/2011 | Sharma | G06F 8/75 717/101 |
| 8,327,344 B2 | 12/2012 | Gschwind | |
| 8,370,821 B2* | 2/2013 | Haber | G06F 8/4441 717/151 |
| 8,543,992 B2* | 9/2013 | Jiang | G06F 8/4442 717/149 |
| 9,015,690 B2 | 4/2015 | Suresh et al. | |
| 9,569,190 B1* | 2/2017 | Gschwind | G06F 8/452 |
| 2009/0254892 A1* | 10/2009 | Yamashita | G06F 8/456 717/146 |
| 2011/0138373 A1* | 6/2011 | Lane | G06F 8/443 717/157 |

OTHER PUBLICATIONS

Ferrante, Jeanne, Karl J. Ottenstein, and Joe D. Warren. "The program dependence graph and its use in optimization." ACM Transactions on Programming Languages and Systems (TOPLAS) 9.3 (1987): pp. 319-349. (Year: 1987).*

Canfora, Gerardo, Aniello Cimitile, and Andrea De Lucia. "Conditioned program slicing." Information and Software Technology 40.11-12 (1998): pp. 595-607. (Year: 1998).*

Anonymous Author(s), "GPUCheck: Detecting CUDA Thread Divergence with Static Analysis," PLDI'18, Philadelphia, PA, Jun. 18-22, 2018, pp. 1-13.

Haghighat et al., "Symbolic program analysis and optimization for parallelizing compilers," In International Workshop on Languages and Compilers for Parallel Computing, Springer, Berlin, Heidelberg, 1992, pp. 538-562.

Kumar et al., "An Improved Algorithm for Loop Dead Optimization," ACM SIGPLAN Notices Homepage archive, vol. 40 Issue 11, Nov. 2005, pp. 18-28.

Mahlke et al., "Effective Compiler Support for Predicated Execution Using the Hyperblock," Center for Reliable and High-Performance Computing, IEEE, 1992, pp. 1-10.

Pouchet et al., "Loop transformations: convexity, pruning and optimization," POPL '11 Proceedings of the 38th annual ACM SIGPLAN-SIGACT symposium on Principles of programming languages, 2011, pp. 549-562.

Shou et al., "Toward efficient flow-sensitive induction variable analysis and dependence testing for loop optimization," Proceeding, ACM-SE 44 Proceedings of the 44th annual Southeast regional conference, 2006m pp. 1-6.

Stoutchinin et al., "Efficient Static Single Assignment Form for Prediction," IEEE, 2001, pp. 1-10.

* cited by examiner

GCD Test — 310

$$gcd(a_1 - b_1, a_2 - b_2, \ldots, a_{k-1} - b_{k-1}, a_k, \ldots, a_{n_1}, b_1, \ldots, b_{n_2}) \mid (b_0 - a_0)$$

Banerjee Test — 320

$$-b_k - \sum_{i=1}^{k-1}(a_i - b_i) - (N_i - 1)$$
$$-(a_k + b_k) + (N_k - 2)$$
$$-\sum_{i=k+1}^{n_1} a_i(M_i - 1) - \sum_{i=k+1}^{n_2} b_i(N_i - 1)$$
$$\leq \sum_{i=0}^{n_2} b_i - \sum_{i=0}^{n_1} a_i$$

Fig. 3

```
#define TABLESIZE 32
int tid = get_thread_id();
int idx = tid;
if (idx > TABLESIZE)
    idx = TABLESIZE;
A[idx] = foo();
```

Fig. 4

```
1  #define TABLESIZE 32
2  for (int a = 0; a < N; ++a) {
3      int idx = a;
4      if (idx > TABLESIZE)
5          idx = TABLESIZE;
6      A[idx] = foo();
7  }
```

Fig. 5

```
1  #pragma omp parallel for private(y)
2  for(x = 0; x < width; x++) {
3    for(y = 0; y < height; y++) {
4      finalImage[x][y] = RenderPixel(x,y, &sceneData);
5    }
6  }
```

Fig. 6

```
for (j = 1; j < NJ - 1; ++j) {
  for (i = 1; i < NI - 1; ++i) {
    for (k = 1; k < NK -1; ++k) {
      B[i*(NK * NJ) + j*NK + k] = foo(i,j,k);
    }
  }
}
```
910

FIG. 9A

```
for (CIVJ = 0; CIVJ < NJ - 2; ++CIVJ) {
  j = CIVJ + 1;
  for (CIVI = 0; CIVI < NI - 2; ++CIVI) {
    i = CIVI + 1;
    for (CIVK = 0; CIVK < NK - 2; ++CIVK) {
      k = CIVK + 1;
      B[i*(NK * NJ) + j*NK + k] = foo(j,i,k);
    }
  }
}
```
920

FIG. 9B

```
for (CIVJ = 0; CIVJ < NJ - 2; ++CIVJ) {
  j = CIVJ + 1;
  for (CIVI = 0; CIVI < NI - 2; ++CIVI) {
    i = CIVI + 1;
    for (CIVK = 0; CIVK < NK - 2; ++CIVK) {
      B[i*(NK * NJ) + j*NK + (CIVK + 1)] = foo(j,i,(CIVK + 1));
    }
  }
}
```
930

FIG. 9C

COMPILER FOR RESTRUCTURING CODE USING ITERATION-POINT ALGEBRAIC DIFFERENCE ANALYSIS

BACKGROUND

The present invention generally relates to improvements to computer technology and particularly to compilers for improving the efficiency of computer programs by informing restructuring code using iteration-point algebraic difference analysis.

Computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Restructuring of loop code is a transformation of computer programs attempted by optimizing compilers. A requirement for most any such transformation is a dependence analysis—a process that computes dependences both within and across loop iterations with the goal of determining relationships between program statements in a loop. Program-statement dependence information is essential when restructuring loop code both to speculate on the performance impact of such transformations as well as to ensure that the semantics of the original program are preserved. Dependence analysis is an integral part of any industrial-strength optimizing compiler. Compilers typically use a sequential series of refinements to a data dependence graph though multiple different techniques. Such organization is well suited for the addition of new, more powerful, analysis techniques over time to get even more precision.

SUMMARY

According to one or more embodiments described for pruning a dependence graph for a loop in a computer program, a computer-implemented method includes determining, by a compiler, a source and a sink of a dependence in the dependence graph. The method further includes determining, by the compiler, a source symbolic expression for the source, and a sink symbolic expression for the sink. The method further includes constructing, by the compiler, a difference expression using the source symbolic expression and the sink symbolic expression. The method further includes checking, by the compiler, if the difference expression is indicative of a memory overlap between the source and the sink. The method further includes, in response to the difference expression being indicative of no overlap, removing the dependence from the dependence graph, and generating object code for the computer program based on the dependence graph.

According to one or more embodiments a system for pruning a dependence graph for a loop in a computer program includes a memory including a computer program that is to be compiled. The system further includes a processor to execute a compiler that compiles the computer program. The compiling includes determining, by a compiler, a source of a dependence in the dependence graph. The compiling further includes determining, by the compiler, a sink of the dependence in the dependence graph. The compiling further includes determining, by the compiler, a source symbolic expression for the source. The compiling further includes determining, by the compiler, a sink symbolic expression for the sink. The compiling further includes constructing, by the compiler, a difference expression using the source symbolic expression and the sink symbolic expression. The compiling further includes checking, by the compiler, if the difference expression is indicative of a memory overlap between the source and the sink. The compiling further includes in response to the difference expression being indicative of no overlap, removing the dependence from the dependence graph. The compiling further includes generating, by the compiler, object code for the computer program based on the dependence graph.

According to one or more embodiments a computer program product for pruning a dependence graph for a loop in a computer program includes a computer readable storage medium having computer executable instructions stored therein. The computer executable instructions when executed by a processing unit cause the processing unit to compile the computer program. The compiling includes determining, by the compiler, a source of a dependence in the dependence graph. The compiling further includes determining, by the compiler, a sink of the dependence in the dependence graph. The compiling further includes determining, by the compiler, a source symbolic expression for the source. The compiling further includes determining, by the compiler, a sink symbolic expression for the sink. The compiling further includes constructing, by the compiler, a difference expression using the source symbolic expression and the sink symbolic expression. The compiling further includes checking, by the compiler, if the difference expression is indicative of a memory overlap between the source and the sink. The compiling further includes in response to the difference expression being indicative of no overlap, removing the dependence from the dependence graph. The compiling further includes generating, by the compiler, object code for the computer program based on the dependence graph.

According to one or more embodiments a method for compiling a computer program includes pruning a dependence graph for a loop in the computer program. The pruning includes determining, by a compiler, a source of a dependence in the dependence graph. The pruning further includes determining, by the compiler, a sink of the dependence in the dependence graph. The pruning further includes determining, by the compiler, a source symbolic expression for the source. The pruning further includes determining, by the compiler, a sink symbolic expression for the sink. The pruning further includes constructing, by the compiler, a difference expression using the source symbolic expression and the sink symbolic expression. The pruning further includes checking, by the compiler, if the difference expression is indicative of a memory overlap between the source and the sink. The pruning further includes in response to the difference expression being indicative of no overlap, removing the dependence from the dependence graph. The pruning further includes generating, by the compiler, object code for the computer program based on the dependence graph.

According to one or more embodiments, a system for compiling a computer program includes a memory having the computer program that is to be compiled. The system further includes a processor to execute a compiler that compiles the computer program. The compiling includes pruning a dependence graph for a loop in the computer program. The pruning includes determining, by the compiler, a source of a dependence in the dependence graph. The pruning further includes determining, by the compiler, a sink of the dependence in the dependence graph. The pruning further includes determining, by the compiler, a source symbolic expression for the source. The pruning further includes determining, by the compiler, a sink symbolic expression for the sink. The pruning further includes constructing, by the compiler, a difference expression using the source symbolic expression and the sink symbolic expression. The pruning further includes checking, by the compiler, if the difference expression is indicative of a memory overlap between the source and the sink. The pruning further includes in response to the difference expression being indicative of no overlap, removing the dependence from the dependence graph. The pruning further includes generating, by the compiler, object code for the computer program based on the dependence graph.

In one or more examples, the dependence graph includes a plurality of dependences. Further, in one or more examples, both, the source and the sink represent a same program statement in the loop, the source being an execution of a program statement from a first iteration, and the sink being an execution of the program statement from a second iteration. For example, the source represents a program statement scheduled to be executed by a first thread and the sink is a program statement scheduled to be executed by a second thread. Alternatively, or in addition, the source represents a first program statement in the loop, and the sink represents a second program statement in the loop.

In one or more examples, constructing the difference expression includes rewriting the source symbolic expression for ith iteration (f(i)) by substituting i with i' to generate a second source symbolic expression f(i'), i' being a different iteration i'>i. The construction further includes generating the difference expression as f(i')−g(i), where g(i) is the sink symbolic expression for the ith iteration. Further, the construction includes simplifying the difference expression by canceling one or more common terms. Checking whether the difference expression is indicative of a memory overlap includes verifying if an equation f(i')−g(i)=0 has a solution, the equation representing the difference expression being equated to 0.

It is to be understood that the embodiments of the present invention are not limited in application to the details of construction and to the arrangements of the components set forth in the following description or illustrated in the drawings. The present invention is capable of embodiments in addition to those described and of being practiced and carried out in various ways. The features described herein can be included in one or more embodiments of the present invention in any possible combination thereof. Also, it is to be understood that the phraseology and terminology employed herein, as well as the abstract, are for the purpose of description and should not be regarded as limiting. As such, those skilled in the art will appreciate that the conception upon which this disclosure is based may readily be utilized as a basis for the designing of other structures, methods, and systems for carrying out the several purposes of the presently described embodiments of the present invention.

BRIEF DESCRIPTION OF THE DRAWINGS

FIG. 3 depicts example dependence graph pruning tests performed by a compiler.

FIG. 4 depicts an example of a data-parallel bounded array access according to one or more embodiments.

FIG. 5 depicts another example code analyzed by a compiler according to one or more embodiments.

FIG. 6 depicts an example code loop that is to be compiled by a compiler according to one or more embodiments.

FIG. 9A depicts another example code snippet that is to be compiled.

FIG. 9B and FIG. 9C depict intermediate versions of the code snippet from FIG. 9A during compilation.

Figure 1:
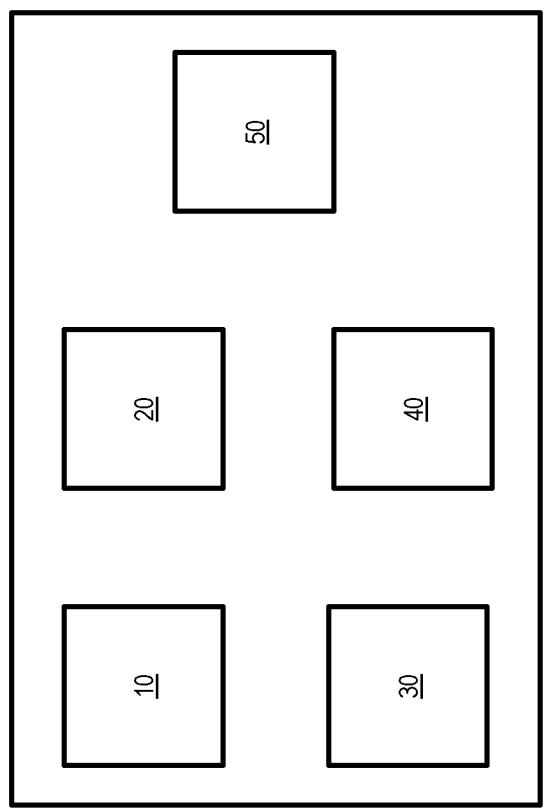
FIG. 1 depicts a block diagram of an example computer system according to one or more embodiments.
Figure 1:

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

FIG. 1 depicts a block diagram of an example computer system according to one or more embodiments. The computer system 100 may be a server computer, a desktop computer, a laptop computer, a tablet computer, a phone, or any other computing device that can compile a computer program to generate corresponding object code and/or machine code. In the illustration, the computer system 100 is shown to include a processor 10, a memory device 20, a first computer program 30, a compiler 40, and a second computer program 50. It should be noted that the computer system 100 may include additional components, such as a keyboard, display, etc. which are not shown here for brevity. The processor 10 may include multiple processing units that can operate in parallel, for example by executing computer executable instructions concurrently. The processor 10 may be a graphics processing unit (GPU), a central processing unit (CPU), or any other type of processing unit that facilitates concurrent execution of processing threads, or a combination of such processor types.

Further, the processor 10 is coupled with the memory 20 to read/write computer executable instructions and data during one or more operations. Further yet, the first computer program 30, the second computer program 50, and the compiler 40 may include one or more instructions that are stored in the memory 20. The memory 20 may include a main memory, storage memory, cache memory, and other types of memory that a computer system may use.

The first computer program 30 is a computer program that is written in a high-level language that is easy to understand by a human programmer. The compiler 40 takes the human-readable form of the first computer program 30, known as "source code", and converts it into the second computer program 50, which is the "machine code" or "object code" instructions that may be executed by the processor 10 of the computer system 100 or any other system. Because the compiler 40 generates the stream of machine code instructions 50 that are eventually executed on a computer system, the manner in which the compiler 40 converts the source code 30 to the object code 50 affects the execution time of the computer program 30.

The execution time of a computer program, especially complex computer programs, is a function of the arrangement and type of instructions within the computer program. Loops affect the execution time of a computer program. If a computer program contains many loops or contains any loops that are executed a relatively large number of times, the time spent executing loops will significantly impact the execution time of a computer program. Accordingly, restructuring the code inside a loop can improve the efficiency of the execution. The embodiments of the present invention described herein facilitate restructuring the computer program instructions to optimize the execution time based on analyzing the dependence of the computer program instructions or code.

Figure 2:
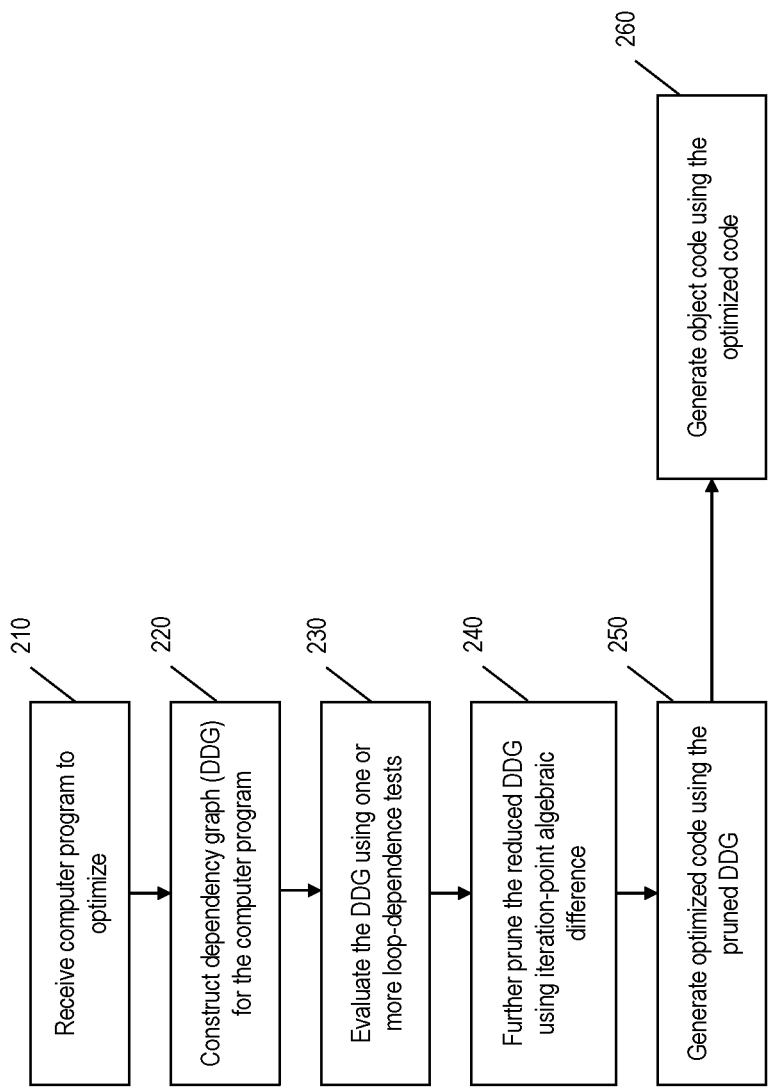
FIG. 2 depicts a flowchart of an example method for generating object code for a computer program using iteration-point algebraic difference according to one or more embodiments.

FIG. 2 depicts a flowchart of an example method for generating object code for a computer program using iteration-point algebraic difference according to one or more embodiments. The method may be executed by the compiler 40 in response to the first computer program 30 being compiled for generating the second computer program with the corresponding machine code. The method includes accessing the first program code 30 by the compiler 40, at 210. The method further includes generating a dependency graph (DDG) by the compiler 40, at 220.

Restructuring of loop code is a type of transformation that requires a dependence analysis—a process that computes dependencies both within and across loop iterations with the goal of determining relationships between program statements in a loop. Program-statement dependence information is essential when restructuring loop code both to speculate on the performance impact of such transformations as well as to ensure that the semantics of the original program is preserved. Dependence analysis is an integral part of any industrial-strength optimizing compiler. Determining a precise dependence graph and pruning a dependence graph by identifying independent program statements in an iterative loop is a technical challenge.

Dependence analysis aims to discover dependencies between program statements that impose constraints in their order of execution. Two categories of dependencies that compiler designers typically consider are loop-carried dependences and loop-independent dependences. Loop-independent dependencies are those where a statement in one iteration of a loop depends only on a statement in the same iteration of the loop. Loop-carried dependencies are those that only exist between statements across different iterations of the loop(s) to which they belong, i.e. if the loop is removed, the dependence disappears. Such relationships between program statements are further categorized into three useful dependence groups: 1. Flow: Statement 51 writes to a memory location later read by statement S2; 2. Anti: Statement 51 reads a memory location later written to by statement S2, and 3. Output: Statement S1 writes to a memory location later written to by statement S2.

The notion of dependence is easily extended to statements in the context of loop nests, with the loop iteration space being represented as an iteration vector $[i_1; i_2; \ldots ; i_n]$ for an n-dimensional loop nest, where vector elements correspond to induction-variable values for that particular level in the loop nest. Much of the dependence theory relies on loops being in normalized form, converting loop code into normalized form is usually an early step in the compilation process. From there, a dependence graph (DDG), or a dependence flow graph, is constructed that attempts to capture statement relations along with additional information such as dependence distance vectors: the distance in a number of iteration for all applicable loop nest levels that induce the dependence. This information is then used for safety and profitability analysis of various loop restructuring transformations.

It should be noted that according to one or more embodiments, the compiler 40 constructs the DDG pessimistically, and thus includes dependencies that may never occur when the program 30 is executed—they are included in the graph because the initial analysis cannot prove that the memory references do not overlap. A dependence included in the DDG is represented by an edge between two nodes, each node corresponding to a program statement.

After the initial construction, several techniques are used to attempt to remove edges from the DDG until a final form is obtained to be used by the compiler 40 for transformations, that is, restructuring the code from one form to another by rearranging the program statements to optimize the runtime efficiency. For example, a dependence that was included in an earlier version of the DDG but that is later proven false is deemed as a false-positive dependence, i.e. it was earlier imprecisely deemed to be a dependence, but it is not a real one. The embodiments of the present invention described herein improve the pruning of the DDG to facilitate the compiler 40 to perform one or more transformation algorithms that optimize parallelization of the computer program 30, such as automatic loop parallelization.

The generated DDG is evaluated and reduced using one or more loop-dependence tests, at 230. Typically, a given dependence test handles elimination of a subset of initially constructed dependences that share common characteristics required for that specific test to be conclusive. For example, some dependencies may have the source and sink addressing expressions expressed as linear affine functions of induction variables for which a minimum and maximum value can be determined at compilation time. The Banerjee test, which is commonly used, facilitates the compiler 40 to handle such cases and results in the removal of dependencies of this class from the DDG.

Consider a general loop code of the form shown in Table 1. The technical problem of deciding if distinct iterations can run in parallel is to decide whether there is a loop-carried dependence between the two array references, which can be reduced to solving the equation $[x*i'+c]=[y*i'+b]$ s.t. $i \neq i'$. If a solution exists, then the same memory location is accessed by two different iterations and, as long as one of the accesses is a write, iterations cannot be scheduled to run simultaneously without changing the program behavior. Accordingly, compilers can use techniques such as the Greatest Common Divisor (GCD) Test 310 and the Banerjee test 320, which are defined as shown in FIG. 3.

TABLE 1

```
for (int i = 0; i < N; ++i) {
S1: A[x*i+c] = ...;
S2: ... = A[y*i+b]; }
```

Generalizing statements from Table 1, consider that the statements "S1:A[f(i)]=. . . ;" and "S2: . . . =A[g(i)];" are enclosed in k common loops, S1 enclosed in n1 loops, S2 enclosed in n2 loops and $i=[i_1; i_2; \ldots ; i_k]$, a vector of their respective normalized induction variables. That is, $f(i)=a_0+\Sigma_{j=1}^{k}a_ji_j$ and $g(i)=b_0+\Sigma_{j=1}^{k}b_ji_j$. In this case, the GCD test 310 and the Banerjee test 320, both tests depicted in FIG. 3, provide a sufficient, but not necessary, condition to make the claim that statements S1 and S2 do not induce a loop-carried dependency. It should be noted that the GCD test 310 and the Banerjee test 320 are used as examples, and that in other examples of compilers, different tests can be used to determine if the statements S1 and S2 induce/do not induce a loop-carried dependency when evaluating for parallelization. Once it is identified by the evaluation that the statements S1 and S2 do not induce a dependency, the DDG can be pruned by removing a relationship between those statements.

However, a downside to both of the existing approaches (e.g. the GCD test 310 and the Banerjee test 320, and other techniques) is that if the equation $f(i)=g(i')$ has no solutions, then there are no two iteration points that can produce a dependence so the loop can execute in parallel; if $f(i)=g(i')$ is true for some (i, i' $i \neq i'$), then there might be a loop dependence, i.e. the loop might still be parallelizable, but the analysis is not able to arrive at that conclusion. Thus, such tests fail to optimize the loop entirely, or in other words, fail to optimize the code in some cases because the compiler 40 does not execute the loop in parallel if the loop dependence is identified.

The embodiments of the present invention described herein address such technical challenges by using iteration-point algebraic difference (IPAD) analysis to further evaluate and prune the DDG that has already been reduced by the loop-dependent test(s), at 240. This IPAD test reduces the DDG even further, eliminating dependence relations deemed to be false-positive or loop-independent for the sake of proposed loop transformations. For example, performing the IPAD test enables the compiler to use code transformation algorithms such as loop parallelization safety analysis, and loop collapse safety analysis, which could not be used without having the DDG pruned using IPAD.

To this end, the embodiments of the present invention described herein facilitate extending and using arithmetic control form (ACF) static analysis to capture linear and non-linear relationships between program statements. ACF represents both the flow of data through a program and conditionally defined values. ACF facilitates combining data and control flow by computing symbolic equations for expressions of interest. ACF converts conditionally executed statements into predicated statements, in effect, capturing all potential traces through the program and the definitions that they contain. A resulting ACF expression includes binary operations on constants and symbols representing unknowns (values that are not known at compilation time). For expressions nested inside loops, references to induction variables are detected explicitly and are also treated as unknown symbolic values.

In the context of a data-parallel program, using ACF facilitates computing an algebraic difference on the symbolic representation of statements. For example, consider a statement S that is executed by different threads, and assume that S contains an addressing expression $A[f(\text{idx})]$, where idx is the identifier of a thread executing the code. The embodiments of the present invention described herein, by using ACF, facilitate the compiler 40 to construct an algebraic expression for the difference between the symbolic values of the function $f$ computed by two distinct threads. Then, by substituting actual constant thread identifiers into these symbolic expressions, the compiler 40 can determine the memory access stride between threads.

FIG. 4 depicts an example of a data-parallel bounded array access according to one or more embodiments. In the example shown in FIG. 4, by using ACF, the compiler 40 is able to compute the distance between memory locations accessed by adjacent threads in the array store statement in line 6 of the example code snippet 410. Further, the compiler 40, using ACF, can freely replace variable references with their definitions, wherever possible, during the construction of ACF expressions. The compiler 40 can perform such replacement without any additional considerations for potential performance impact the replacement might have because ACF expressions are symbolic and are not actual Intermediate Representation (IR) of the program 30 that undergoes transformation and code-generation.

For instance, following is the symbolic expression computed by the compiler 40 based on ACF for the value of A[idx] at line 6 in FIG. 4, in accordance with an embodiment:

$$ACF(A[idx])=([tid]>32)\times([\&A]+4\times 32)+([tid]\leq 32)\times ([\&A]+4\times tid)$$

In the above (and in further description) 32 is an artifact of the source code example in FIG. 4, which uses the value of 32 as a boundary in a conditional statement. Further, the value of 4 is a value that represents a size of a memory access by the processor (array element size). It should be noted that in other examples, different values may be used instead of 32 and 4 based on the specific scenario. In the above expressions, the original expression's references to the variable idx are replaced with their definition in terms of tid, which is the source of the thread-dependent behavior. This symbolic propagation allows the compiler 40 to compute the actual inter-thread memory access stride. This computation substitutes constant parameters in place of thread identifiers and performs algebraic simplification:

$$ACF_1(A[idx]) - ACF_0(A[idx]) =$$
$$(1 > 32) \times ([\&A] + 4 \times 32) + (1 \leq 32) \times ([\&A] + 4 \times 1) -$$
$$(0 > 32) \times ([\&A] + 4 \times 32) + (0 \leq 32) \times ([\&A] + 4 \times 0) =$$
$$([\&A] + 4) - [\&A] = 4$$

Here, constant thread identifiers of 0 and 1 are used for the sake of example, and in other examples the compiler 40 may calculate the constant memory access difference between accesses of a larger number of threads (e.g. 4, 16, 32, 64, 128 or any other stride) and arrive at a memory access stride description based on the average.

However, using ACF to compute the inter-thread stride of an addressing expression relies strictly on the presence of a source of thread-dependent behavior in the expression. For example, in the example code in FIG. 4, the source of the thread-dependence is the query of get thread id( )(code line 2). The embodiments of the present invention described herein facilitate the compiler 40 to compute symbolic differences based on the induction variable of a loop. For example, the compiler 40 can detect different behavior caused by induction variables that appears inside an addressing expression. The compiler 40 with such an extended ACF can calculate the difference in the expression's value across iterations of a loop. Accordingly, instead of just an inter-thread access stride, the compiler 40 can also compute an inter-iteration access stride, making the compiler 40 able to optimize cases for non-data-parallel programs.

FIG. 5 depicts another example code analyzed by a compiler according to one or more embodiments. The code in this example is similar to the code in FIG. 4, but modified so that the loop induction variable a is the source of different behavior. An ACF symbolic expression computed for the value of A[idx] in line 6 of the code is similar to the one before, the only change being the replacement of [tid] in the expression with the symbolic unknown [a]:

$$ACF(addr)=([a]>32)\times([\&A]+4\times 32)+([a]\leq 32)\times([\&A]+ 4\times [a])$$

FIG. 6 depicts an example code loop that is to be compiled by a compiler according to one or more embodiments. An example code snippet 610 shows an example loop that has been marked for parallelization using a library such as OpenMP™. In such loops, different iterations might be scheduled to be executed by different threads. Thus, computing the inter-iteration difference is equivalent to computing the inter-thread difference. In contrast to the example in FIG. 4, this computation does not make explicit use of thread-identifier variables. The compiler 40 can detect such different behavior caused by induction variables in parallel loops, such as those written using parallelization libraries like OpenMP™.

Referring back to the flowchart of FIG. 2, once the DDG has been pruned further after using the IPAD test to evaluate each dependence in the DDG, the compiler 40 performs loop code optimizations using the pruned DDG, at 250. The code optimization includes restructuring of the program statements in the first computer program 30. For example, the restructuring includes performing one or more transformations such as loop parallelization, loop collapse, and the like. The method further includes generating machine code 50 that is used for execution of the first computer program 30, the machine code 50 generated using the optimized code, at 260. The method accordingly improves the performance of the execution of the firsts computer program 30 and thus provides an improvement to computer technology by reducing the DDG even further, eliminating dependence relations deemed to be false-positive or loop-independent for the sake of proposed loop transformations.

Figure 7:
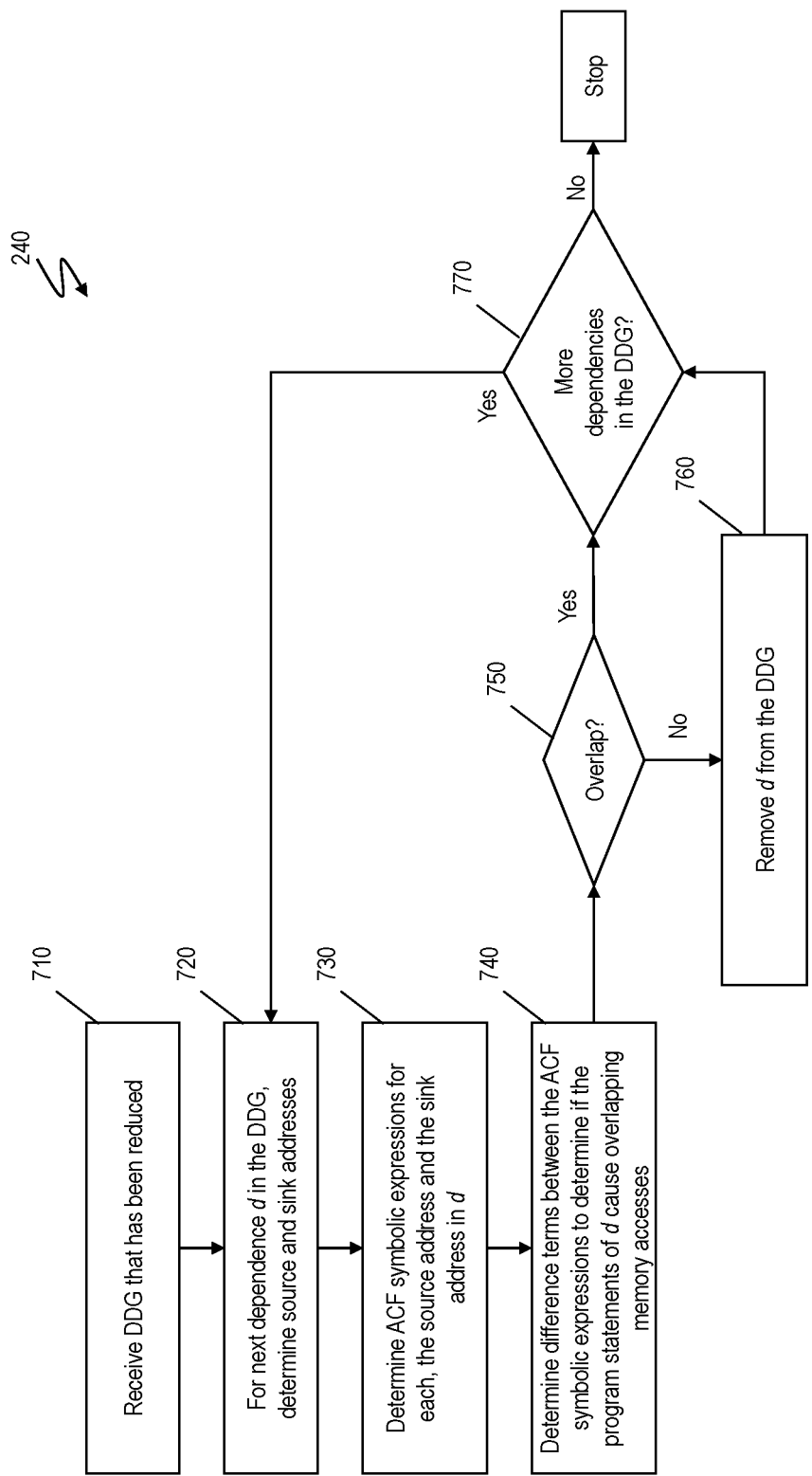
FIG. 7 depicts a flowchart of an example method of evaluating a dependence graph by performing an iterative point algebraic difference (IPAD) test used for pruning the DDG according to one or more embodiments.

FIG. 7 depicts a flowchart of an example method of evaluating the DDG by performing the IPAD test used for pruning the DDG according to one or more embodiments. The method may represent one or more operations performed when implementing the block 240 depicted in FIG. 2. The method includes receiving, by the compiler 40, the DDG generated and reduced so far, for example using tests such as the CDG test 310 and the Banerjee test 320, among others, at 710. The DDG includes one or more dependencies representing the relationship between pairs of program statements in the first program 30 that is being compiled. The method further includes determining a source and a sink for a dependence d in the DDG, at 720. The relationship between source/sink and read/write is determined by dependence type between two program statements that access the same memory address (physical location): Flow Dependence: source=writes, sink=reads; Anti Dependence: source=reads, sink=writes; Output Dependence: source=writes, sink=writes.

Further, the method includes determining ACF symbolic expressions for each, the source and the sink using one or more techniques based on an extended ACF framework as described herein, at 730. Let $f(i)$ be the symbolic ACF expression for the dependence source and $g(i)$ for the dependence sink. These symbolic ACF values are used to determine if the two addressing expressions may overlap for any two distinct iterations of a loop that is a candidate for parallelization, at 740.

Figure 8:
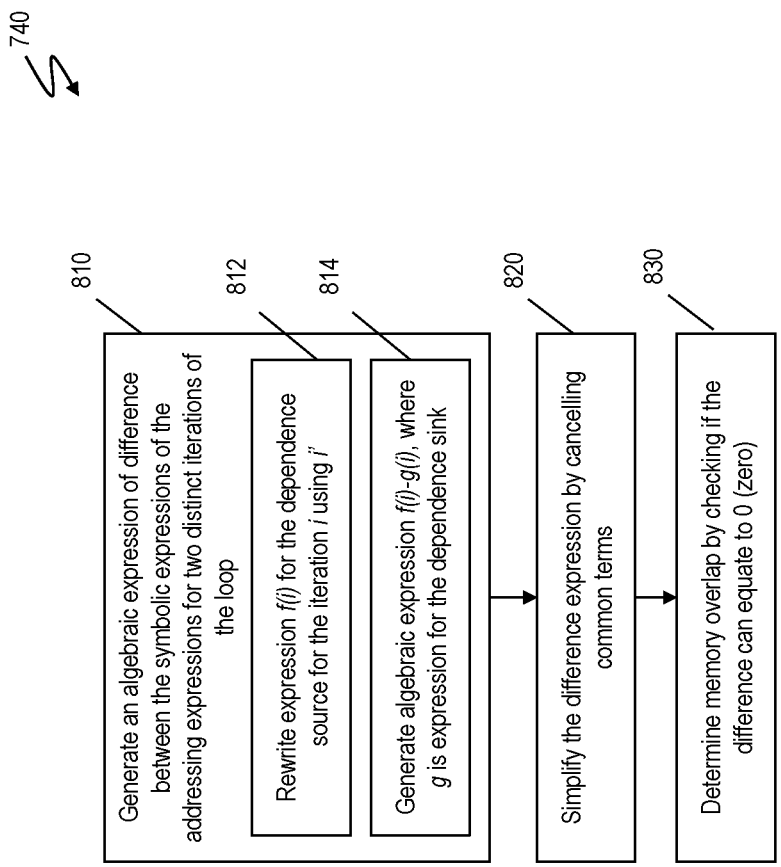
FIG. 8 depicts a flowchart of an example method for a compiler to determine if two program statements from distinct iterations of a program loop have a memory overlap according to one or more embodiments.

FIG. 8 depicts a flowchart of an example method for a compiler to determine if two program statements from distinct iterations of a program loop have a memory overlap according to one or more embodiments. To answer the query, and determine whether there is memory overlap, the compiler 40 constructs an expression for the algebraic difference between the symbolic expressions of the addressing expressions for two distinct iterations of the loop, at 810. Without loss of generality, let i and i'>i be these two iterations. First, the ACF expression of the dependence source, $f(i)$, is rewritten into $f(i')$ by substituting all references to i with i', at 812. The compiler further creates a symbolic expression $f(i')-g(i)$, $g(i)$ being the ACF expression for the dependence sink, at 814. It is immaterial which of the two values $f/g$ is chosen to be rewritten in terms of i'. The compiler 40 further simplifies difference values by cancelling out common terms, at 820. In one or more examples, the final simplified difference value is refactored such that i and i' only appear as a direct difference term (i'-i), by factoring out the induction variables' common multipliers.

With the ACF expression in this form, the compiler 40 checks whether or not the addressing expressions for two distinct iteration points have a memory overlap by verifying if the equation $f(i')-g(i)=0$ has solutions, at 830. This verification includes the following series of steps:

First, the ACF expression is split at the top-level into its Left-Hand-Side (LHS) expression and its Right-Hand Side (RHS) expression. Further, the expression is rewritten into an inequality and manipulate this inequality to isolate either the LHS or the RHS of the top-level expression into one side of the inequality. For example, (LHS+RHS≠0)→(LHS≠-RHS); (LHS−RHS≠0)→(LHS≠RHS); (LHS×RHS≠0)→(LHS≠0^RHS≠0). Further yet, occurrences of the constant-value range (i'−i) in the symbolic expressions are propagated up in the ACF expressions. If the final range on the LHS does not overlap with the final range on the RHS, then the equation is deemed to have no solutions.

Typically, ACF is used to compute differences between multiple versions of the same expression as each version is evaluated by multiple threads to detect divergent behavior. By using the embodiments of the present invention described herein, the compiler 40 computes the difference between symbolic representations of distinct expressions. For example, let $E_s$ be the expression used to compute the address of the source of a loop-carried dependence and let $E_t$ be the expression for the target of the same dependence. Typically, $E_s$ and $E_t$ are similar enough that the computation between the ACF symbolic representations of $E_t$ and $E_s$ produces a simplified expression that can be used to determine under which specific conditions the dependence actually occurs. The ACF symbolic difference computed as described above can be used to determine a false positive, that is, the dependence actually never occurs at runtime and accordingly, the loop iterations can be scheduled to execute in parallel. Moreover, for the cases where the ACF difference simplification above does not provide information to increase the precision of the dependence relations, the soundness of the results is not affected. Accordingly, computing the difference facilitates determining a memory overlap between a sink and source even with distinct expressions.

Referring back to the flowchart of FIG. 7, the compiler checks if the program statements of the dependence d that is being analyzed have a memory overlap between distinct iterations, at 750. If the analysis above successfully shows that the inter-iteration algebraic difference equation has no solutions (that is, there is no overlap), then the dependence d from the DDG is deemed to be a false-positive and it is removed from the DDG, at 760. Besides discovering that some of the earlier reported dependences are false positive, the compiler 40 also can determine that a true dependence is actually a loop-independent dependence, i.e. it only occurs within a loop iteration, and thus will not prevent parallelization. If the analysis does not detect any overlap (at 750), the method continues to analyze a next dependence d, if there are any more dependencies left to check in the DDG, at 770. The method iterates over each dependence d in the DDG, at 770. Once all dependencies in the DDG are analyzed, the method ends and the compiler 40 proceeds with further operations towards generating the machine code.

Further to determining the false positives in a single loop as described above, the compiler 40 can determine that dependencies whose source and target are at different iteration points in a loop nest are false positives. For example, consider that the address of the dependence source be given by $f(i_1, i_2, \ldots i_k)$ and the address of the dependence target (sink) is given by $g(i_1, i_2, \ldots i_k)$, where $i_m|(1 \leq m \leq k)$ is the induction variable of the loop in the nest. The set of induction variables $i_m|(1 \leq m \leq k)$ is regarded as a point in an iteration space, and a distance between two points in this iteration space can be expressed as a $\Delta i$ expressions: $(i'_m - i_m)|(1 \leq m \leq k)$. The expression rewrite in terms of i'* is done for all the induction variables involved and this rewrite produces a difference of the form $f(i'_1, i'_2, \ldots i'_k)-g(i_1, i_2, \ldots i_k)$. Analogous to the single loop case, the simplified difference expression is refactored to be a function of $\Delta i$ expressions.

To ensure that the addressing expressions do not overlap on any two iteration points of the loop nest, the compiler 40 checks, individually, for the possible overlap of addressing expressions across iterations of all of the loops in which the expressions are contained. For each loop in the nest, the testing process is as described above (FIG. 7), except that the $\Delta i$ terms of all other loops in the nest are assigned a value of 0 (zero). Replacing $\Delta i_n$ terms with 0 fixes the iteration of loop n. For example, when checking for addressing expression overlap across iterations of loop $p|(1 \leq p \leq k)$, the symbolic difference expression is first rewritten such that every $(i'_m - i_m)|(m \neq p)$ is replaced with the constant value of 0. The resulting expression contains only one $\Delta i$ term: $\Delta i_p$. Thus, verifying the algebraic difference equality on the resulting symbolic expression guarantees that the addressing expressions do not overlap across iterations of loop p.

However, the lack of overlapping addressing expression values across iterations of each of the individual loops in the nest does not guarantee that the addressing expression does not overlap for any two arbitrary iteration points. The analysis soundness also requires testing for potential overlap of the addressing expression across iterations of combinations of loops. The same algebraic difference equality test is performed on difference expressions where an arbitrary combination of $\Delta i$ terms is preserved, and all $\Delta i$ terms of induction variables belonging to loops not included in the given combination are assigned the constant value of 0. This process is detailed below.

Let $I = \{i_1, i_2, \ldots i_k\}$ be the set of all induction variables in a loop nest. By definition, the power set of I, P(I), is the set of all subsets of I, including the empty set and I itself. The compiler has to evaluate the set $P'(I)=P(I)\backslash I\backslash \Phi$, where the symbol '\' here represents the set minus operator. For every set $A \in P'(I)$, assign a constant value of 0 to every $\Delta i_l | i_l \notin A$, thus preserving only the $\Delta i$ terms of induction variables of loops that are in A. The resulting difference expression then undergoes the same algebraic difference test as described in FIG. 7. By doing this test for every set in P(I'), the compiler 40 ensures that the addressing expressions do not overlap for any two iteration points of the nest. In such a case, if all loop combinations yield no cases where the addressing expressions overlap for any iteration point, then the dependence is deemed to be false-positive for the entire loop nest and is removed from the DDG.

The embodiments of the present invention described herein facilitate the compiler to further prune the DDG to identify dependences that are false positives and removing such dependences from the DDG so that a loop and/or a loop nest may be further optimized for execution, such as by parallelizing the code in the loop(s). The embodiments of the present invention described herein use symbolic-value propagation to determine the false positives, rather than using constant and copy propagation that is typically used for such dependence tests. Such copy propagation typically is more conservative than the embodiments of the present invention described herein because it has to avoid inserting loop-invariant computation into the body of loops.

FIG. 9A, FIG. 9B, and FIG. 9C depict example code snippets to be compiled and during compilation phases. When a compiler compiles the code snippet 910 in FIG. 9A, without using the IPAD test described herein, the compiler may conclude that there is an output dependence on the array access to B at line 4. That is, the analysis cannot verify that any two distinct iteration points of the j-i-k loop nest do not store a value to the same memory location. To further understand why consider the normalized version 920 (FIG. 9B) of the code snippet 910. In the normalized snippet 920, CIVJ, CIVI, CIVK are the normalized induction variables (IV). Further, a normalized loop nest 930 of the loop nest after copy propagation is depicted in FIG. 9C, as it exists in the compiler 40 by the time the dependence analysis runs. In 930, references to k (from 910) have been replaced with its propagated definition of (CIVK+1) in terms of the normalized IV; yet, references to variables j and i are left in the original form. Their definitions in terms of normalized IVs are not propagated in this example because such propagation leads to more redundant re-computation (increment operations) inside the body of a potentially hot loop. Copy propagation rightfully tries to avoid these re-computations in favor of a smaller size for the addressing expression and to maintain the hoisting of computation invariant to the inner loop to a point outside of that loop.

A consequence of the conservative copy propagation is that the addressing expression consists of references to variables that are no longer, effectively, induction variables. The existence of such addressing expression in a loop complicates the analysis and leads state-of-the-art analyses to be unable to prove that a dependence is a false positive. For example, both, the GCD test 310 and the Banerjee test 320 (FIG. 3) make an explicit assumption that the functions f(i) and g(i) are defined strictly as linear functions of induction variables with constant weights. Such technical challenge of the present techniques is addressed by the compiler 40 by using the embodiments of the present invention described herein by propagating variable definitions to their references across control flow, with the symbolic value computed by the analysis having the following form:

$$AFC(Addr) = [B] +$$
$$((1 + ((([CIVJ] + 1) * NK) + ((([CIVI] + 1) * (NK * NJ)) + [CIVK]))) * 4)$$

Here, references to all loop variables in the loop nest j, i, k are replaced with their definitions, leaving the expression to be a function of solely induction variables and constants.

Further, the ACF expression based embodiments of the present invention described herein can handle non-constant induction variable multipliers used in the first program 30. The GCD test 310 and the Banerjee test 320 (FIG. 3) depend on the induction variable multipliers being compile-time constants. For example, the GCD test 310 has no way of deciding divisibility if one of its operands is an unknown runtime value, and the Banerjee test 320 is not able to compute the multiplier sums in order to evaluate the inequality. The embodiments of the present invention described herein facilitate the compiler 40 to resolve more precisely potential dependences when the induction-variable multipliers are not compile-time constants. If the two expressions that make up the algebraic iteration point difference are similar enough, both will contain the same runtime values as induction variable multipliers, which are factored and canceled, leaving the expression in terms of the induction variables and other constants only.

In one or more examples, if the common runtime values cannot be cancelled during difference simplification, coupling the IPAD test with a constant range analysis facilitates the compiler to solve such cases. For example, for the loop: for (int a=0; a<max; a++) {A[max*a]=. . . }, the constant-range analysis determines that the statement a<max must be true on the array access A[max*a], and therefore max≥1. This facilitates the compiler to solve the difference equation for the array access as executed in different iterations of the a loop and ensure that no two array accesses overlap. Without a constant range analysis, the value of max may equal 0, in which case the analysis may conclude that the array access may overlap across all iterations.

Further, the embodiments of the present invention described herein facilitate handling of non-linear functions of induction variables by the compiler 40. The presently available DDG pruning techniques (such as in FIG. 3) require the addressing expressions of the dependence source and sink to be expressed as linear functions of induction variables of the containing loops. Considering the code snippet 510 from FIG. 5, with the embodiments of the present invention described herein, the compiler 40 constructs a symbolic expression of the array index by combining traces through the code snippet 510 leading up to it:

$$ACF(addr)=([i]>[VAL])\times([A]+4\times[i])+([i]\leq[VAL])\times([a]+4\times[i])$$

Despite the non-linearity of the expression, the compiler extracts useful information about the store to A. For example, its access stride can be computed by constructing an inter-iteration difference equation as described herein, but substituting constant values for the loop induction variable, as a source of divergent behavior.

The embodiments of the present invention described herein thus facilitate a compiler to optimize the execution time of a program by generating efficient machine/object code for execution. The embodiments of the present invention described herein thus provide an improvement to computing technology. The embodiments of the present invention described herein facilitate the compiler to optimize the execution time by pruning a dependence graph generated by detecting false positives in the identified dependences using an iteration point algebraic difference (IPAD) test, which provides symbolic propagation. The pruned dependence graph facilitates the compiler to optimize the machine/object code by enabling the compiler to parallelize a loop (or loop nest), collapse a loop (or loop nest), and the like which cannot be performed with the dependence graph pruned using the IPAD test.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a compiler, a source of a dependence in a dependence graph for a loop in a computer program, the source being a first node in the dependence graph, the first node representing a first program statement from the computer program;
   determining, by the compiler, a sink of the dependence in the dependence graph, the sink being a second node in the dependence graph, the second node representing a second program statement from the computer program;
   determining, by the compiler, a source symbolic expression for the source, wherein the source symbolic expression identifies a first memory address that is accessed by the first program statement, the first memory address is based on a thread identifier of a first thread that executes the first program statement;
   determining, by the compiler, a sink symbolic expression for the sink, wherein the sink symbolic expression identifies a second memory address that is accessed by the second program statement, the second memory address is based on a thread identifier of a second thread that executes the second program statement;
   constructing, by the compiler, using iteration-point algebraic difference analysis, a difference expression using the source symbolic expression and the sink symbolic expression, the constructing comprising:
      computing an inter-thread memory access stride;
      propagating replacement of thread identifiers in symbolic expressions with memory address values based on the inter-thread memory access stride;
   determining, by the compiler, based on the memory address values, if the difference expression is indicative of a memory overlap between the source and the sink during execution of the first program statement by the first thread and of the second program statement by the second thread;
   in response to the difference expression being indicative of no overlap, pruning the dependence graph by removing the dependence from the dependence graph, the dependence being an edge between the first node and the second node in the dependence graph; and
   generating, by the compiler, object code for the computer program based on the dependence graph that is pruned.

2. The computer-implemented method of claim 1, wherein the dependence graph comprises a plurality of dependences.

3. The computer-implemented method of claim 1, wherein both the source and the sink represent a same program statement in the loop, the source being an execution of a program statement from a first iteration, and the sink being an execution of the program statement from a second iteration.

4. The computer-implemented method of claim 1, wherein the source represents the first program statement in the loop, and the sink represents the second program statement in the loop.

5. A system comprising:
   a memory comprising a computer program that is to be compiled;
   a processor configured to execute a compiler that compiles the computer program, the compiling comprises:
      determining, by the compiler, a source of a dependence in a dependence graph for a loop in the computer program, the source being a first node in the dependence graph, the first node representing a first program statement from the computer program;
      determining, by the compiler, a sink of the dependence in the dependence graph, the sink being a second node in the dependence graph, the second node representing a second program statement from the computer program;
      determining, by the compiler, a source symbolic expression for the source, wherein the source symbolic expression identifies a first memory address that is accessed by the first program statement, the first memory address is based on a thread identifier of a first thread that executes the first program statement;
      determining, by the compiler, a sink symbolic expression for the sink, wherein the sink symbolic expression identifies a second memory address that is accessed by the second program statement, the second memory address is based on a thread identifier of a second thread that executes the second program statement;
      constructing, by the compiler, using iteration-point algebraic difference analysis, a difference expression using the source symbolic expression and the sink symbolic expression, the constructing comprising:
         computing an inter-thread memory access stride;
         propagating replacement of thread identifiers in symbolic expressions with memory address values based on the inter-thread memory access stride;
      determining, by the compiler, based on the memory address values, if the difference expression is indicative of a memory overlap between the source and the sink during execution of the first program statement by the first thread and of the second program statement by the second thread;
      in response to the difference expression being indicative of no overlap, pruning the dependence graph by removing the dependence from the dependence graph, the dependence being an edge between the first node and the second node in the dependence graph; and
      generating, by the compiler, object code for the computer program based on the dependence graph that is pruned.

6. The system of claim 5, wherein the dependence graph comprises a plurality of dependences.

7. The system of claim 5, wherein both the source and the sink represent a same program statement in the loop, the source being an execution of a program statement from a first iteration, and the sink being an execution of the program statement from a second iteration.

8. The system of claim 5, wherein the source represents the first program statement in the loop, and the sink represents the second program statement in the loop.

9. A computer program product comprising a computer readable storage medium having computer executable instructions stored therein, the computer executable instructions when executed by a processing unit cause the processing unit to compile a computer program, the compiling comprises:
   determining, by a compiler, a source of a dependence in a dependence graph for a loop in a computer program, the source being a first node in the dependence graph, the first node representing a first program statement from the computer program;

determining, by the compiler, a sink of the dependence in the dependence graph, the sink being a second node in the dependence graph, the second node representing a second program statement from the computer program;

determining, by the compiler, a source symbolic expression for the source, wherein the source symbolic expression identifies a first memory address that is accessed by the first program statement, the first memory address is based on a thread identifier of a first thread that executes the first program statement;

determining, by the compiler, a sink symbolic expression for the sink, wherein the sink symbolic expression identifies a second memory address that is accessed by the second program statement, the second memory address is based on a thread identifier of a second thread that executes the second program statement;

constructing, by the compiler, using iteration-point algebraic difference analysis, a difference expression using the source symbolic expression and the sink symbolic expression, the constructing comprising:
    computing an inter-thread memory access stride;
    propagating replacement of thread identifiers in symbolic expressions with memory address values based on the inter-thread memory access stride;

determining, by the compiler, based on the memory address values, if the difference expression is indicative of a memory overlap between the source and the sink during execution of the first program statement by the first thread and of the second program statement by the second thread;

in response to the difference expression being indicative of no overlap, pruning the dependence graph by removing the dependence from the dependence graph, the dependence being an edge between the first node and the second node in the dependence graph; and generating, by the compiler, object code for the computer program based on the dependence graph that is pruned.

10. The computer program product of claim 9, wherein both the source and the sink represent a same program statement in the loop, the source being an execution of a program statement from a first iteration, and the sink being an execution of the program statement from a second iteration.

11. The computer program product of claim 9, wherein the source represents the first program statement in the loop, and the sink represents the second program statement in the loop.

* * * * *